United States Patent [19]
Dato Solis et al.

[11] Patent Number: 5,930,258
[45] Date of Patent: Jul. 27, 1999

[54] STRUCTURE FOR AN ELECTRONIC DATA SYSTEM

[75] Inventors: Juan Dato Solis; Victor Cruz Medina, both of Madrid, Spain

[73] Assignee: Telefonica de Espana, S.A., Madrid, Spain

[21] Appl. No.: 08/753,732

[22] Filed: Nov. 29, 1996

[30] Foreign Application Priority Data

Nov. 30, 1995 [ES] Spain ................................. 9502378

[51] Int. Cl.⁶ ..................... H04L 12/28; H04L 12/46; H04L 12/66
[52] U.S. Cl. .................. 370/401; 395/200.79; 395/200.8
[58] Field of Search ................................. 370/401, 402, 370/403, 404, 405, 465, 466, 467; 395/200.02, 200.06, 200.79, 200.8, 200.31, 200.33, 200.53, 200.54, 200.55, 200.56

[56] References Cited

U.S. PATENT DOCUMENTS

| | | | |
|---|---|---|---|
| 5,442,630 | 8/1995 | Gagliardi et al. | 370/401 |
| 5,535,199 | 7/1996 | Amri et al. | 370/401 |
| 5,604,737 | 2/1997 | Iwami et al. | 370/401 |
| 5,610,910 | 3/1997 | Focsaneanu et al. | 370/351 |
| 5,724,355 | 3/1998 | Bruno et al. | 370/401 |
| 5,740,231 | 4/1998 | Cohn et al. | 370/401 |
| 5,745,556 | 4/1998 | Ronen | 379/127 |

*Primary Examiner*—Chi H. Pham
*Assistant Examiner*—Ricky Q. Ngo
*Attorney, Agent, or Firm*—Thelen, Reid & Priest, LLP

[57] ABSTRACT

An electronic data system is shown that allows unified access to many currently available information provider services, and that gives the information provider services a way to access potential users without the requirement that they have their own infrastructure.

5 Claims, 2 Drawing Sheets

STRUCTURE FOR AN ELECTRONIC DATA SYSTEM

BACKGROUND OF THE INVENTION

1. Field of the Invention

The present invention relates to a structure for an electronic data system. More specifically, the invention relates to a structure for an electronic data system embodied in a structure for an information provider access system offering unified access to any of the currently available services, and offering providers a means for accessing the user without the requirement that they have their own infrastructure.

2. Related Art

The applicant is aware of various electronic data services, including the following:

Various BBS access systems of greater or lesser data structure complexity;

Videotext services, such as Ibertex or Minitel;

Data systems with Internet access, as provided internationally by CompuServe, America Online and IBM, and nationally by Servicom and Goya;

Internet access systems over a videotext system, such as the service provided by Alcatel-Bell; and Microsoft Network, recently launched by Microsoft as a worldwide data network.

None of the existing systems provide unified access to such electronic data services, as well as allowing Internet access through a plurality of providers, while remaining neutral, such that the user is assigned an IP (Internet protocol) address by the selected provider.

SUMMARY OF THE INVENTION

The electronic data system of the present invention overcomes the deficiencies of existing systems by allowing unified access to various electronic data services, together with Internet access by assigning the user an IP (Internet protocol) address.

An object of the present invention is to provide unified, standardized access to electronic data services, i.e., all services can be accessed via a single telephone number.

A further object of the present invention is to provide a means by which a user has the ability to determine various features offered by the electronic data services, such as the billing system used by each service, user requirements (hardware and software) for access to a particular service, etc.

Still another object of the present invention is to allow for access to different Information Provider Centers (IPC) using any communications application available on the market at a low surfing cost; with the surfing access cost for each service being determined flexibly for each provider, and the relevant charges being billable to the user's credit card.

Yet another object is to provide for increased competition among providers (price, quantity and quality of service), by enabling the user to easily compare the features of various providers at any time by consulting the provider IPC, thus allowing the user to make an informed choice of a provider.

A still further object is to allow for transparent connection to different networks through different interfaces and types of signaling.

Another object of the present invention is to allow an information provider to field centralized information service requests through universal access.

Yet another object is to allow an information provider to eliminate the need to establish parallel networks or infrastructure for accessing various electronic data services, thus eliminating costs associated with operating and managing such networks and infrastructure.

A still further object is to allow an information provider to reduce the response time required for marketing new services.

Another object is to minimize an information provider's investment required to market profitable electronic data services at low cost.

Yet another object of the present invention is to allow an information system operator to enhance their existing networks.

Still another object is to provide an efficient way for an information system operator to collect revenues for functions provided (Information Provider Centers).

Another object is to allow an information system operator to provide their own information content to the user, thus incorporating themselves into the system as another provider.

Yet another object of the present invention is to provide an information system operator with a vehicle for the development of new businesses and for provision of comprehensive services.

According to the present invention, the foregoing and other objects and advantages are attained by a structure for an electronic data system comprising the following components:

(1) User Terminals, which are commercial devices such as a personal computer running DOS, Windows or OS/2 as an operating system or a Macintosh computer, on which the system access software is installed.

(2) In addition to the personal computer, the user needs either a modem to connect over a Switched Telephone Network (STN), or a terminal adapter to connect to an Integrated Services Digital Network (ISDN) access line.

(3) A User Access Network provides users' PCs with access over a Switched Telephone Network (STN) or Integrated Services Digital Network (ISDN) connection by establishing a physical circuit with a Service Center (Centro de Servicio, CSIV) over a transit network.

(4) The Service Centers (CSIVs) or nodes on the system are distributed on the basis of geographical criteria.

Each Service Center (CSIV) or node is composed of a series of Local Area Network (LAN) segments grouped together by a data concentrator, thus interconnecting various devices at the CSIV. The various devices interconnected at the CSIV are explained below:

(a) Multi-line devices or switching matrices establish temporary connections between input channels to the User Access Networks and output channels of a Communications Server, under the control of the CSIV's main computer.

A user channel is established by a device for signaling the User Access Network and the CSIV to set up communication. The signaling device adapts signals supplied by the User Access Network and signals processed by the Communications Server. The signals supplied by the network are processed automatically, thus notifying the CSIV computer.

(b) The Communications Server is composed of one or more units, with one of the units containing a set of modems needed to process analog signals. The Communications Server connects the users to the internal LAN, over which the various IPCs can be accessed.

During the user-to-system connection phase, the Communications Server initiates a dialogue with an IPC to request an individual IP (Internet Protocol) address, and subsequently routes all the user's IP (Interet Protocol) frames to the IPC access.

(c) The CSIV Central Computer is a commercial computer that monitors user access to the various Information Provider Centers (IPCs) and provides space for the IPCs.

(d) A Local Installation Terminal is designed to install and configure the CSIV and each of its component devices.

(e) A console for controlling the configuration and application of each multi-line unit, is directly connected to the Service Center (CSIV) computer.

(f) Routers are provided for TCP/IP connections to the IPCs and to a Management Center (Centro de Gestion, CGIV).

(5) An Information Provider Center (IPC) Access Network connects the Service Centers (CSIV) with the various IPCs. A Packet Switching Network, Integrated Services Digital Network (ISDN), or dedicated voice+data lines can be used to establish the connection between the CSIV and the various IPCs.

(6) The Management Center (CGIV) is composed of a Local Area Network (LAN), to which the following devices are connected:

(a) A Main Computer (HOST) with high processing and storage capacity that handles remote management of the various Service Centers (CSIV) on the system.

(b) Management and Operation Terminals, which serve as consoles for local installation tasks.

(c) Local Installation Terminals, which serve as consoles for local installation tasks, and therefore are directly linked to the Service Center (CSIV) computers.

(d) Terminals pertaining to the Information Provider, for remote access to the CGIV over an X.25 TCP/IP network.

(e) Infrastructure devices, including a set of I/O devices, such as printers, tape drives, scanners, CD-ROMs, etc.

(7) System Software is provided to be run on the various components of the electronic data system according to the present invention; including various modules running on (a) the User Terminals; (b) the Service Centers (CSIVs); (c) the Management Center (CGIV); (d) the terminals used by the Information Providers; and (e) the Information Provider Centers (IPCs).

The electronic data system structure of the present invention also provides means for validating and assigning user addresses, whereby IP (Internet Protocol) addresses can be assigned to the user for the duration of a session via a chosen provider, thus significantly reducing the load on the provider's server and improving access speed for the connected user.

The components described above are interconnected to perform the following tasks:

The User Terminal is a standard PC on which a program for accessing the information system is installed, allowing two connection methods or types of access:

(1) The user can connect to the appropriate service center (CSIV) via PPP (point-to-point protocol), and the service center (CSIV) assigns the user an IP (Internet Protocol) address managed by the information system.

With this type of connection, the user can establish a session with all Information Provider Centers (IPCs) that provide service using this connection method, but not with those that provide service using the second method, described below.

(2) The user can connect to the appropriate Service Center (CSIV) via PPP (point-to-point protocol), using the features of the protocol to specify a particular Information Provider Center (IPC) by which the user wants to be assigned an IP (Internet Protocol) address. The Service Center (CSIV) acts as a bridge between the user and the IPC specified by the user. The Service Center (CSIV) provides the user with the IP (Internet Protocol) address supplied by the specified Information Provider Center; while the IP address is managed by the IPC itself.

With this type of connection, the user can establish a session via the particular IPC that supplied the IP address.

A single IPC can thus provide service using one of the above-described two connection methods. However, one provider can have two different IPCs on a single computer, each with its own connection method.

The user does not need to have previously subscribed in order to access the system, since the charge for using the service appears on the user's telephone bill, with a per minute rate for calls to a system number.

Any STN user can access the system, regardless of the type of exchange (digital or analog) to which he or she is connected.

Service Centers (CSIVs) give users access to existing IPCs. They provide the user with a unified platform for accessing the various IPCs at low cost using TCP/IP as a shared access protocol, with the program used to access the IPC running on top.

With the switching matrices that are used, the CSIV can connect to (a) telephone exchanges using E and M signaling, thus serving users on the Switched Telephone Network (STN); and (b) exchanges using ISDN User Part signaling, thus providing service over an interface shared by users of the Switched Telephone Network (STN) and the Integrated Services Digital Network (ISDN).

The switching matrix is also provided with a DSS1 (Digital Subscriber System No. 1) interface compatible with the matrix accepted by the Communications Server, thus making it possible to set up a call between the matrix and the Communications Server by adapting the signals supplied by the network and those accepted by the Communications Server to each other.

The Communications Servers through which the user accesses the system allow the IP (Internet Protocol) address used to communicate with a CSIV to be assigned by the system itself or an IPC connected to the system.

Complete control can be achieved using these user access communications servers and the routers for connecting to the information providers, by setting up filters on the IPCs with which the user can establish a session, imposing restrictions on connections and controlling the TCP/IP sessions established by the user.

Additionally, the routers for connecting to the various information providers can establish TCP/IP communications between a CSIV and the IPCs over a wide range of protocols (X.25, FR, ISDN, etc.), thus allowing a unified platform to be created for accessing the IPCs.

Management and Operation Terminals provide the means for operators to connect to the Management Center (CGIV) and access its functions, in accordance with the access privileges assigned to each operator.

Provider Terminals provide the means for providers to connect to the Management Center (CGIV) and access its functions in order to find out information on their IPCs, in accordance with the access privileges assigned to each operator.

The following tasks can be carried out via the Management Center (CGIV):

(1) Configuring the Service Centers (CSIV); adding to/removing/changing the physical components of the CSIV and configuring the logic and application data—such as identifying the services to which it provides access, the service providers, and information from the guide to services, etc.

The configuration data can be dynamically updated while the CSIV continues to provide the service.

(2) Management of alarms generated in the CSIVs, with the option of activating or blocking alarm generation, such that the operator can control the alarms received.

The alarms are ranked into various categories by importance, and are immediately displayed to the operator in a readable format.

(3) Operational quality control, based on service measurement data received from the CSIVs. At the operator's request, the CGIV generates reports on a particular Service Center's equipment or on a specific device at the Service Center.

(4) Billing and record keeping, logging information on services used for calls made by users to the IPCs through the various CSIVs, and calls made to the provider IPC.

The CGIV is provided with mechanisms for selective queries regarding a specific CSIV, a provider or one particular service.

(5) Security Management, used to specify the various operators with access to the system, assigning them the group of operations they can perform and monitoring connections.

The CGIV is also used for monitoring communications to prevent unauthorized connection, by identifying the data terminal devices belonging to the CGIV and all the CSIVs under its control, within the same closed group of users.

The system also comprises an Information Center on Providers, offering users information on the available IPCs in hypertext format.

Such information is furnished by the provider hosting the IPC, and can include text, graphics and sound.

The Information Center on Providers also provides system connection software updates.

The System Software handles all data system logic. It breaks down into two parallel segments: applications software, which runs the service provided by the system, and infrastructure software, on top of which the applications software runs.

The System Software comprises the following subsystems:

The User Terminal comprises the applications software needed to connect to the service and select the IPC access and telecharge method, while the infrastructure software includes the following modules or subsystems: the Operating System, the TCP/IP communications software and a set of basic TCP/IP clients, such as WWW, FTP, Telnet, Mail, etc.

The Service Center applications software comprises a System Services module or subsystem and a Data and Communications Resources module, while the infrastructure software consists of a Distributed Processing Program, Data Resources Software, Channel Switching Software, Communications Software, and Data Storage and Operating System.

The Management Center applications software includes a User Interface module, a Configuration module, a Maintenance module, an Operational Quality module and a Billing and Record-Keeping module. The infrastructure software includes the Operating System and the Communications, Data Storage, Graphical Interface and Distributed Processing Software.

Moreover, the validation and user address assignment method itself, which assigns IP (Internet Protocol) addresses to the user, sets this data system fundamentally apart from other existing data systems.

The validation and IP (Internet Protocol) address assignment method, when put into practice, consists of using equipment that accepts ISDN signals and signals from the Switched Telephone Network, so as to support direct IP (Internet Protocol) routing regardless of the destination of the frame, and sending all traffic of a single user to a single address determined at the time of connection. The computer of the relevant Service Center processes the call and configures the IP (Internet Protocol) routers/filters for each call.

The services that can be accessed over the specified structure can be grouped into two types:

(1) Password Services, where entry into the system must first be validated by the provider of the service to which access is desired, with such password services being further categorized into:

(a) password services that also designate an IP (Internet Protocol) address for the user (generally Internet access providers); and (b) password services that do not designate an IP address for the user (authenticated services that nevertheless have system IP (Internet Protocol) address).

The access method put into practice based on the structure according to the present invention offers users a multiple Internet provider environment. To achieve this goal:

(i) The System connects users to different Internet access providers at the same time. Users go through a single access procedure, during which they provide their login ID and the identification of the provider(s) with which they are registered.

(ii) The Internet access providers identify the users who want to connect upon receipt of the requests for access to internet access providers.

(iii) After identifying a user who has requested access, the Internet access providers assign the user an IP (Internet Protocol) Internet address (taken from the range of addresses controlled by the provider). Since a single internet access provider can be connected to various service centers (CSIVs), the assignment of an IP address is made from a pool of addresses associated with each CSIV.

(iv) The electronic data system of the present invention ensures that all IP (Internet Protocol) frames from a user connected to an Internet provider are sent solely to the provider (which has already validated the user and assigned an IP (Internet Protocol) address). To achieve this result, the frame is routed on the basis of its source (in both the system access device and the output equipment).

(v) When a user terminates his or her connection, the system informs the provider, thus allowing the provider to reuse the IP (Internet Protocol) address and perform user-billing operations.

(2) Non-Password Services, where the user enters the system anonymously and can surf over all services of this type. In the case of Non-Password systems, the only information that users wishing to enter the system must send from their PC is the name of the IPC to which they want to connect. User requests are processed entirely by the system equipment, which selects a system IP (Internet Protocol)

address for the user and makes the connection for the user (enabling a temporary path).

The user establishes their identity by using an identifier that specifies the user's name and the relevant provider.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
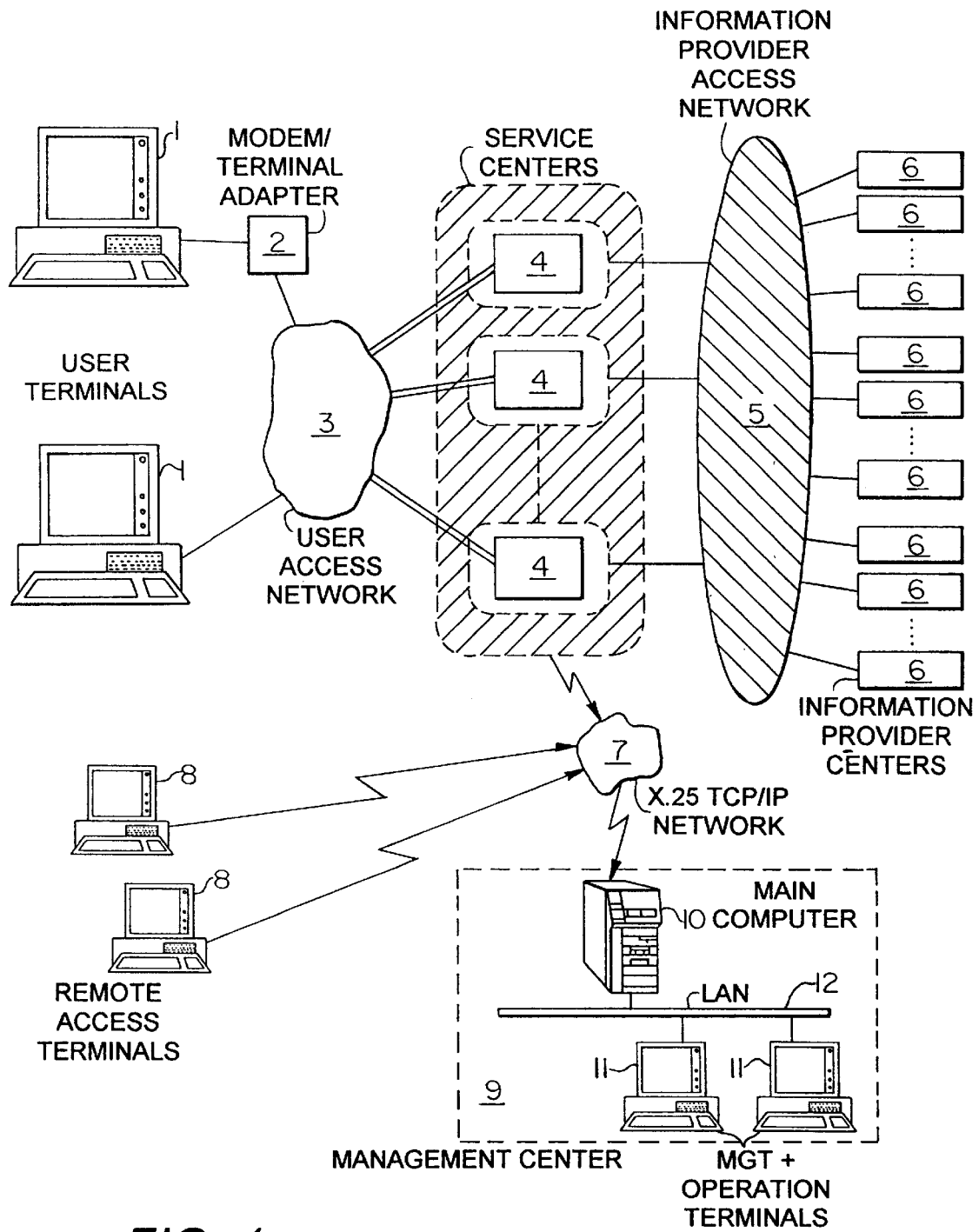
FIG. 1 illustrates the overall structure of the Electronic Data System according to the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIG. 1 shows the structure for an embodiment of the Electronic Data System of the present invention, consisting of several User Terminals 1 connected to a User Access Network 3, either via a modem 2 for connections over the Switched Telephone Network (STN), or an Integrated Services Digital Network (ISDN) access line.

In practice, access is over a physical circuit to a Service Center (CSIV) 4 or node on the system, of which there may be several, distributed on the basis of geographical criteria.

An Information Provider Center Access Network 5 connects the Service Centers (CSIVs) 4 with various Information Provider Centers (IPCs) 6.

A Packet Switching Network (IBERPAC), an Integrated Services Digital Network (ISDN), or dedicated voice+data lines (IBERMIC) can be used for the Access Network 5.

A Management Center (CGIV) 9 consists of an Ethernet Local Area Network 12, that connects to a Main Computer 10 with high processing and storage capacity. Main Computer 10 handles remote management of the various CSIVs 4 on the system over an X.25 TCP/IP network 7.

Management and Operation Terminals 11 serve as consoles for local operation, maintenance and administration tasks.

The system also includes a series of terminals 8 for the Information Providers to gain remote access to the CGIV 9 over the X.25 TCP/IP network 7.

Figure 2:
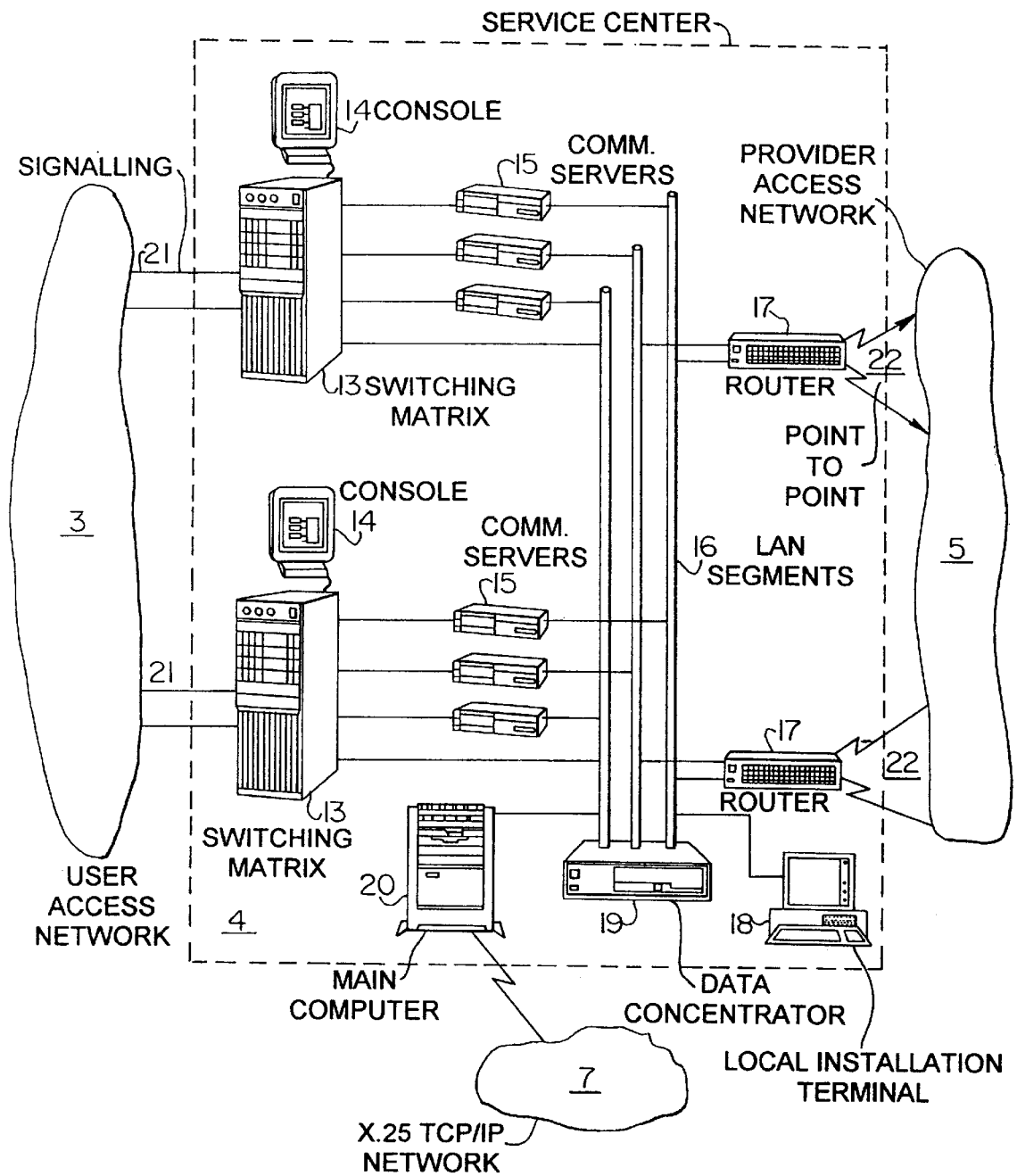
FIG. 2 illustrates the structure of a Data Service Center (CSIV). This description can be supplemented, and the features of the present invention can be better understood with the help of the two attached pages of drawings, which form an integral part of this specification. Such drawings are provided for illustrative purposes only.

FIG. 2 shows the detailed structure of a Service Center (CSIV) 4, wherein a series of Local Area Network 16 segments are grouped together by a data concentrator 19, thus interconnecting the various devices at the Service Center.

CSIV 4 includes multi-line devices or switching matrices 13 that establish temporary connections between input channels from User Access Networks 3 and output channels to communications servers 15, under the control of the CSIV's main computer 20.

Communications servers 15 include means for adapting the signals supplied by User Access Networks 3 and the signals processed by communications server 15, as User Access Networks 3 and communications servers 15 communicate through switching matrices 13 to set up a user channel.

E and M signaling 21 can be used, and connections can also be made with exchanges using ISDN User Part signaling 21, thus providing service over an interface shared by users of the Switched Telephone Network and the Integrated Services Digital Network.

During the user 1 to system connection phase, communications server 15 initiates a dialogue with an Information Provider Center 6 to request an individual IP (Internet Protocol) address, and subsequently routes all the user's IP (Internet Protocol) frames to the IPC access 6.

Central Computer 20 is a commercial computer that monitors user 1 access to the various IPCs 6.

A Local Installation Terminal 18 is designed to install and configure the Service Center 4 and each of its component devices.

Each multi-line or switching matrices 13 is provided with a console 14 for controlling its configuration and application. Console 14 is directly connected to the CSIV computer 20 over Local Area Network 16.

Routing for the TCP/IP connection to the Information Provider Centers 6 and the Management Center 9 is effected with the aid of routers 17, which establish PPP (point-to-point) protocol connections 22.

Modifications and variations of the above-described embodiments of the present invention are possible, as appreciated by those skilled in the art in light of the above teachings. For example, the materials, shape, size and arrangement of the elements may be changed, as long as the essential substance of the invention is preserved.

It is therefore to be understood that, within the scope of the appended claims and their equivalents, the invention may be practiced otherwise than as specifically described.

What is claimed is:

1. An electronic data system, comprising:

a) a user access network, connected to plural user stations, and constituting a network;

b) an information provider access, connected to plural information provider centers, and constituting a data network;

c) a service center, disposed between the user access network and the information provider access network, wherein said service center includes:

c1) multi-line devices connected to respective consoles, each of said consoles providing means for controlling a configuration and an application of an associated multi-line device;

c2) a communications server including a modem;

c3) a computer; wherein said multi-line devices, said communications server, and said computer all are connected to a plurality of local area network segments;

c4) a data concentrator for grouping together said local area network segments;

c5) a local installation terminal for installing and configuring said service center; and c6) routers for establishing point-to-point protocol connections between said service center and said information provider access network; and d) a management center connected to said service center over an X.25 TCP/IP network and having means for adapting signals received from said user access network.

2. The system of claim 1, wherein said computer includes:

means for processing Internet Protocol frames received from said user access network, means for assigning an Internet Protocol address to a user, and means for routing all Internet Protocol frames received from said user to one of said information providers.

3. The system of claim 2, wherein said computer includes:

means for requiring user entry of a password that is subject to validation by an information provider before said computer allows routing of Internet Protocol frames from said user to said information provider.

4. The system of claim 1, wherein said management center includes:

a local area network;

a management computer coupled to the local area network; and a series of operator terminals connected through the local area network to said management computer.

5. The system of claim 4, wherein said management computer includes:

means for performing service operations and management functions and generating reports on components of said service center.

* * * * *